No. 719,743. PATENTED FEB. 3, 1903.
J. A. CAKE.
SINGLETREE ATTACHMENT.
APPLICATION FILED NOV. 17, 1902.
NO MODEL.

Witnesses J. A. Cake, Inventor.
by C. A. Snow & Co.
Attorneys

THE NORRIS PETERS CO., PHOTO-LITHO., WASHINGTON, D. C.

UNITED STATES PATENT OFFICE.

JOHN A. CAKE, OF SUNBURY, PENNSYLVANIA.

SINGLETREE ATTACHMENT.

SPECIFICATION forming part of Letters Patent No. 719,743, dated February 3, 1903.

Application filed November 17, 1902. Serial No. 131,717. (No model.)

*To all whom it may concern:*

Be it known that I, JOHN A. CAKE, a citizen of the United States, residing at Sunbury, in the county of Northumberland and State of Pennsylvania, have invented a new and useful Singletree Attachment, of which the following is a specification.

This invention relates to attachments to vehicles for the purpose of equalizing the strains and absorbing jars and concussions and preventing them from being transmitted to the vehicle, and has for its object the production of a simply-constructed device which may be applied to any vehicle without materially changing any of the parts; and the invention consists in a supporting-frame movably connected to the cross-bar of the vehicle, and to which frame the singletree is movably connected, and the frame provided with a draft-spring disposed to exert its force in the rear of the cross-bar, whereby the draft strains will be borne entirely by the cross-bar.

The invention further consists in a bracket connected to the cross-bar and embracing both its upper and rear surfaces and provided with a rearwardly-extending stud, a supporting-frame movably engaging the bracket and having the singletree movably connected thereto and with one end depending in the rear of the bracket and cross-bar and spaced therefrom, with the stud movably engaging the depending ends, and with a draft-spring upon the stud between the depending end and bracket.

Other novel features of the invention will be disclosed in the annexed description and be specified in the claims following.

Figure 1:
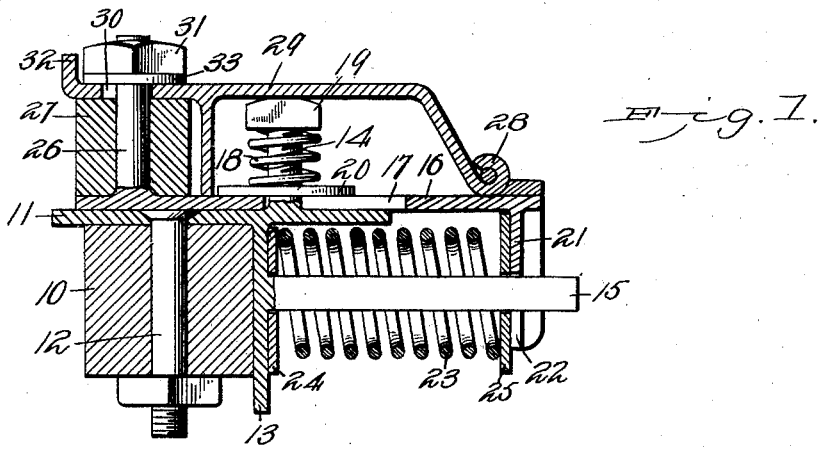
Figure 2:
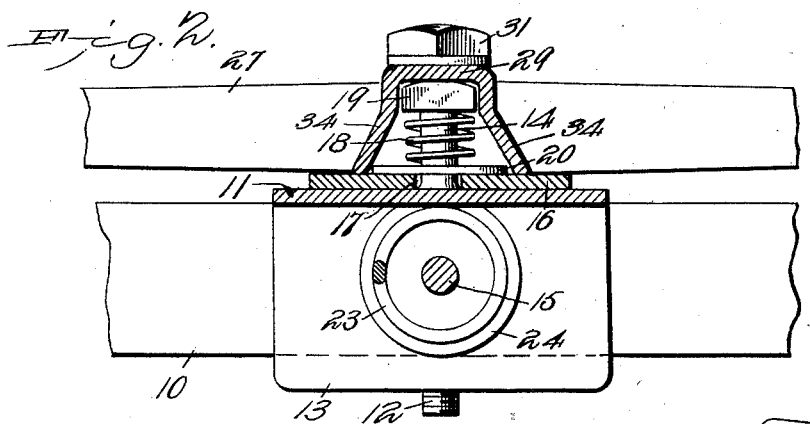
Figures 3, 4:
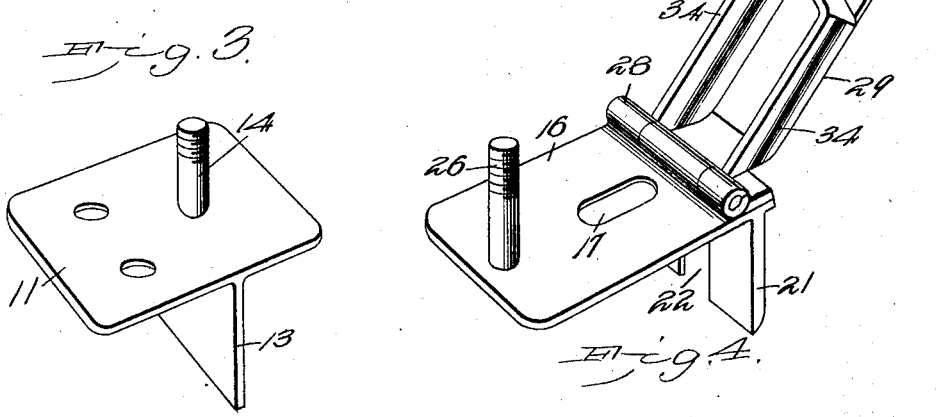

In the drawings illustrative of the invention, and in which corresponding designating characters will be employed for like parts in all the figures, Figure 1 is a sectional elevation of the device applied. Fig. 2 is a transverse section on the line II II of Fig. 1 looking in the direction of the arrow. Fig. 3 is a perspective view of the bracket detached. Fig. 4 is a perspective view of the movable supporting-frame and the combined housing and keeper detached.

The improved device will be attached centrally to the cross-bar connecting the thills of the vehicle, the cross-bar being indicated at 10.

The improved device consists in a bracket formed with an upper portion 11, attached, as by bolts 12, to the cross-bar and having a depending portion 13 in the rear of the cross-bar, the upper portion 11 extending for some distance rearwardly of the cross-bar and provided with an upwardly-extended threaded stud 14, as shown. Extending rearwardly of the depending portion of the bracket is a stud or guide-bolt 15. Movably disposed above the upper portion 11 of the bracket is a supporting-plate 16, having a longitudinal slot 17 engaging the stud 14 and held in place yieldably relative to the bracket by a tension-spring 18, the latter adjustably controlled by a nut 19 upon the stud 14. By this means the frame 16 will be yieldably supported in position and adapted to be moved transversely of the bar 10 within the range of the slot 17. A washer 20 will be disposed between the spring 14 and the frame 16, the washer being of relatively large area to distribute the strains over a comparatively large surface, and thus increase the grip or friction between the parts. The frame 16 is provided with a depending rear portion 21, rigidly connected to or formed integral with the frame and provided with a slot 22, through which the outer end of the guide-bolt 15 extends, as shown. Between the depending portion 21 of the frame 16 and the depending portion 13 of the bracket is located a relatively strong spring 23, coiled about the pin 15 and with supporting-washers 24 25 between its ends and the portions 13 21, respectively, as shown. By this arrangement the force of the spring 23 will be exerted to maintain the frame 16 in its rearward position normally. Extending upward from the forward end of the frame 16 is a stud 26, the stud forming the pivot for the singletree, (indicated at 27.)

Movably connected, as by a hinged joint 28, to the rear end of the frame 16 is a keeper 29, provided at its forward end with an aperture 30, engaging the stud 26 above the evener 27 and held in place by a nut 31. The outer end of the keeper 29 is turned upwardly, as at 32, and adapted to bear against the washer 33 between the nut 31 and the keeper 29 to prevent displacement of the washer.

Between the singletree 27 and the hinged end 28 the keeper is provided with depending outwardly-flaring sides 34, as shown in Fig. 2, to form a housing or cover to the tension-spring 18 and stud 14 and likewise to form a stop to prevent the nut from turning backwardly on the bolt or stud. Thus when the nut 19 is set to produce the required tension between the parts 16 and 11 and the keeper, with its housing portion, placed in position the latter will serve as a lock to the nut 19 and also as a cover or protector to the tension portion of the device.

The flaring portion of the keeper provides for fully covering the relatively large washer 20, as shown in Fig. 2. By this simple arrangement the draft applied to the singletree 27 will be transmitted through the spring 23 to the rear portion of the cross-bar 10 and all the strains therefore borne by the comparatively large solid cross-bar and relieving the smaller parts from the severe strains.

The parts of the device will preferably be made of malleable iron, but may be made of steel or other metal, if preferred, and will be properly proportioned to successfully withstand the strains to which they will be subjected.

The device may be proportioned to fit any-sized vehicle and to vehicles used for different purposes. It will be found particularly advantageous when employed in connection with ambulances, as the starting of the horse will not impart jolts or jars to the vehicle, as the draft will be absorbed in the spring 23 and the motion gradually applied.

The device will likewise be of great advantage in all classes of vehicles, as by its use the motion will be imparted gradually to the vehicle and all danger of jolts and jars obviated. When used in connection with express-wagons and similar vehicles, it will effectually prevent the displacement of barrels, boxes, or other packages, and when used upon buggies and carriages the jolting and jarring caused by riding over rough roads or into hollows will not be imparted to the vehicle. The device will likewise be beneficial to the horse, relieving the animal from many of the severe strains and increasing his comfort.

The device may be modified in minor particulars without departing from the principle of the invention or sacrificing any of its advantages.

Having thus described the invention, what is claimed is—

1. In a vehicle draft apparatus, a cross-bar, a supporting-frame movably disposed relative to said cross-bar and extending rearwardly thereof, a singletree movably connected to said frame, and a draft-spring disposed between said frame and cross-bar, whereby said singletree will be yieldably supported and the draft strains exerted against the rear of the cross-bar, substantially as described.

2. In a vehicle draft apparatus, the cross-bar, a supporting-frame movably disposed relative to said cross-bar and having its outer end depending in the rear of the cross-bar and spaced therefrom, a singletree movably connected to said frame, and a draft-spring disposed between said depending end and the cross-bar, substantially as described.

3. In a vehicle draft apparatus, the cross-bar, a supporting-frame movably disposed relative to said cross-bar and extending rearwardly thereof, a singletree movably connected to said frame, a stud rising from said cross-bar and carrying a tension-spring engaging said frame, and a draft-spring disposed between said frame and cross-bar in position to transmit the draft strains to the rear of said cross-bar, substantially as described.

4. In a vehicle draft apparatus, a cross-bar, a supporting-frame movably disposed relative to said cross-bar and having its outer end depending in the rear thereof and spaced therefrom, a singletree movably connected to said frame, a stud rising from said cross-bar and carrying a tension-spring in engagement with said frame, and a draft-spring between said depending end and cross-bar, substantially as described.

5. In a vehicle draft apparatus, a cross-bar, a bracket carried by said cross-bar and embracing the upper and rear surfaces thereof, a supporting-frame movably disposed relative to said bracket and cross-bar, a singletree movably carried by said frame, and a draft-spring between said frame and bracket and exerting its force against the bracket and cross-bar, substantially as described.

6. In a vehicle draft apparatus, a cross-bar, a bracket carried by said cross-bar and embracing the upper and rear surfaces thereof, a supporting-frame movably disposed relative to said bracket and cross-bar and having a depending inner end in the rear of the cross-bar and spaced therefrom, a singletree movably carried by said frame, and a draft-spring between said depending end and bracket, substantially as described.

7. In a vehicle draft apparatus, a cross-bar, a bracket carried by said cross-bar and embracing the upper and rear surfaces thereof and provided with an upwardly-extending stud, a supporting-frame provided with a longitudinal slot movably engaging said stud, a tension-spring adjustably connected to said stud and exerting its force to maintain said frame in yieldable engagement with said bracket, a singletree movably connected to said frame, and a draft-spring between said frame and bracket, substantially as described.

8. In a vehicle draft apparatus, a cross-bar, a supporting-frame movably engaging said cross-bar and with one end depending in the rear of the cross-bar and spaced therefrom, a stud extending from said cross-bar and movably engaging said depending end, a draft-spring upon said stud between said cross-bar and the depending end of said frame, and a singletree movably engaging said frame, substantially as described.

9. In a vehicle draft apparatus, a cross-bar, a bracket carried by said cross-bar and embracing the upper and rear surfaces thereof, a supporting-frame movably engaging said bracket and with one end depending in the rear of said cross-bar and bracket and spaced therefrom, a stud extending from said bracket and movably engaging said depending end, a draft-spring inclosing said stud between said bracket and depending end, and a singletree movably connected to said frame, substantially as described.

10. In a vehicle draft apparatus, a cross-bar, a bracket carried by said cross-bar and embracing the upper and rear surfaces thereof and having a threaded stud extending therefrom, a supporting-frame having a longitudinal slot movably engaging said stud, a singletree movably connected to said frame, a tension-spring upon said threaded stud, a nut carried by said stud and disposed to regulate the tension of said spring relative to said frame, and a draft-spring between said frame and cross-bar, substantially as described.

11. In a vehicle draft apparatus, a cross-bar, a bracket carried by said cross-bar and having a threaded stud extending therefrom, a supporting-frame having a longitudinal slot movably engaging said stud, a tension-spring upon said threaded stud, a nut carried by said stud and adapted to regulate the tension of said spring, a stud rising from said supporting-frame, a singletree pivotally connected to said stud, a keeper movably connected to said supporting-frame and having an extended perforated end engaging said singletree-pivot and with depending sides inclosing said tension-springs and nut and forming a shield and lock thereto, and a draft-spring between said frame and bracket, substantially as described.

12. In a vehicle draft apparatus, a cross-bar, a supporting-frame movably engaging said cross-bar, a stud rising from said frame, a singletree pivotally connected to said stud, a keeper movably connected to said frame and having an extended perforated end engaging said singletree-stud and with the extremity beyond the pivot turned upward, a nut and washer upon said pivot in the rear of said upturned end, and a draft-spring between said frame and cross-bar, substantially as described.

In testimony that I claim the foregoing as my own I have hereto affixed my signature in the presence of two witnesses.

JOHN A. CAKE.

Witnesses:
JOSEPH SNYDER,
J. A. B. BYERLY.